March 19, 1935.                A. R. MOFFETT                1,994,958
                                  VALVE
                           Filed March 8, 1933

INVENTOR.
A. R. MOFFETT
BY C. L. Drew
ATTORNEY

Patented Mar. 19, 1935

1,994,958

UNITED STATES PATENT OFFICE 1,994,958

VALVE

Archibald R. Moffett, Richmond, Calif.

Application March 8, 1933, Serial No. 659,996

1 Claim. (Cl. 137—53)

This invention relates to improvements in valves and has particular reference to what is commonly known as a poppet valve or pressure relief valve, sometimes referred to as a safety valve.

The principal object of the invention is to produce a valve which will open at a predetermined pressure and will immediately close itself after the pressure has dropped to the predetermined amount.

A further object is to produce a valve which is diaphragm actuated.

A further object is to produce a device wherein the pressure regulating medium is sealed against tampering.

Another object is to produce a valve wherein the valve seat may be readily removed and replaced if worn.

A still further object is to produce a device which is economical to manufacture, and one which will comply with all standard safety codes.

Other objects and advantages will be apparent during the course of the following description.

Figure 1:
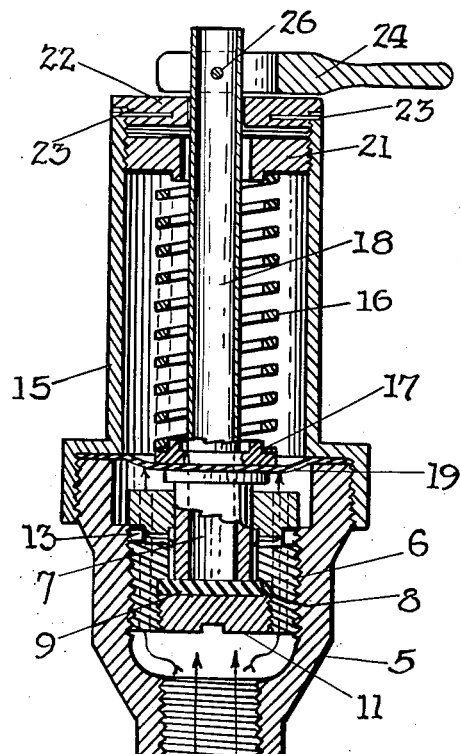
Figure 3:
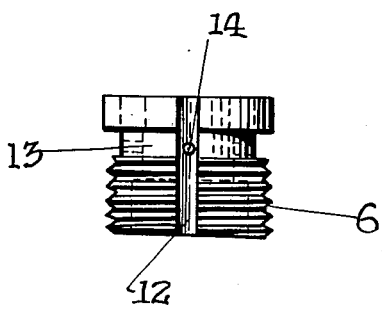
Figure 2:
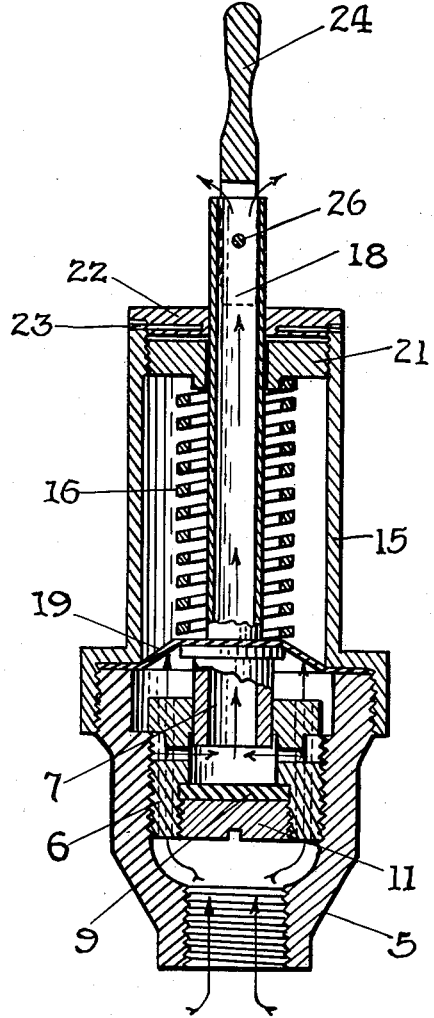

In the accompanying drawing forming a part of this specification and in which like numerals are employed to designate like parts throughout the same, Fig. 1 is a vertical cross section of my valve in closed position, Fig. 2 is a view similar to Fig. 1, with the parts in the position they will assume when the valve is opened, and Fig. 3 is a side elevation of the valve seat holding nut.

Safety valves usually consist of a valve and its seat, the valve being held against the seat by a spring, the tension of which spring is regulated by a screw or in some instances the valve is held against its seat by a weight, the result being that the pressure which actuates the valve must do so by pressing upon the valve itself. Usually the exposed area of the valve is relatively small and consequently the differences in pressure necessary to open the valve or to hold it open after it is opened, or to close the valve after it is open, vary to considerable extent. That is, a valve may require, for instance, fifty pounds pressure to open the valve and yet forty pounds pressure escaping will keep the valve open, for the simple reason that after the valve has left its seat, the exposed area of the valve is increased and consequently the escaping pressure, whether it be air, steam, etc., has a greater area of contact and consequently this lower pressure can keep the valve unseated. Applicant has, therefore, devised a valve wherein the effective area is not increased, the valve being actuated by a pressure diaphragm, which diaphragm unseats and permits seating of the valve within very definite pressure limits, these limits being as low as two or three pounds. Therefore, the pressure ordinarily lost between the blow-off pressure and the reseating pressure, commonly termed the back-down pressure, is materially reduced, and in a big plant, particularly in service stations and where air is employed, it will be apparent that the saving in electrical power between a ten pound back-down pressure and a three pound back-down pressure, will amount to a considerable item in a comparatively short time.

In the accompanying drawing, wherein for the purpose of illustration is shown a preferred embodiment of my invention, the numeral 5 designates a fitting adapted to be attached to any piece of equipment having pressures which are to be maintained at a definite high pressure. Within this fitting is threadedly positioned a valve seat holding nut 6. This nut is counter-bored so as to slidably position one end of a hollow valve 7. A shoulder is formed at 8 against which a valve seat 9 is held by a plug 11. Channels 12 are milled in the side of the nut 6, and communicate with an annular groove 13. Ports 14 extend from the annular groove 13 to the interior of the nut. Threadedly secured to the fitting 5 is a casing 15 which houses a spring 16, one end of which spring bears against a retainer ring 17 carried upon an escape tube 18. This escape tube is secured to the hollow valve 7 in such a manner that a diaphragm 19 is retained between the tube and the valve. The edges of this diaphragm are in turn, compressed between the fitting 5 and the casing 15. A nut 21 bears against the upper end of the spring 16 and therefore regulates the tension of the spring. A cap 22 is threaded in the casing 15 and is preferably pinned in position by pins 23. An operating handle 24 is pivoted as at 26 to the tube 18 so that the valve may be actuated manually, if desired.

The result of this construction is that when my device is attached to a pressure tank, for instance, air pressure will be exerted as indicated by the arrows in Fig. 1, against the diaphragm 19, and is counter-acted by the pressure of the spring 16. Should the pressure be greater than the resistance of the spring, then the pressure will push upwardly on the diaphragm compressing the spring to the position shown in Fig. 2. At this time the pressure may now escape through the channels 12, ports 14 and through the hollow valve and escape tube 18, as shown in Fig. 2. While in the drawing the effective area of the bottom of the hollow valve 7 is relatively large, in actual practice the effective area is relatively small and therefore, does not introduce any serious factors. The drawing has been exaggerated, in order to clearly illustrate applicant's idea. As soon as the pressure has escaped, the spring 16 will push the valve back upon its seat 9 and due to the large area of the diaphragm, it will be apparent that a slight increase or decrease in pressure will effect the opening and closing of the valve, thus making the valve a very accurate and sensitive one.

It will also be noted that the casing may be unscrewed, that the nut may be removed, a new packing placed therein and a nut again screwed to the limit of its movement and the casing returned to the fitting, and that in so doing each of the parts are tightened up to the limit of their thread movement so that all of the parts will remain in proper adjustment. In other words, the device may be repacked without in any way changing the pressure regulation which adds to the safety of the equipment which is an important factor in the lives of the users.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, a fitting, a valve seat holding nut positioned in said fitting, a hollow valve slidably positioned in said nut, a removable valve seat carried by said nut and capable of being contacted by said valve, channels formed in the side of said nut, an annular groove connecting said channels, ports connecting said annular groove and said hollow valve when open, a diaphragm overlying said valve, a tube extending from said valve through said diaphragm, and spring means tending to depress said valve against said valve seat.

ARCHIBALD R. MOFFETT.